UNITED STATES PATENT OFFICE.

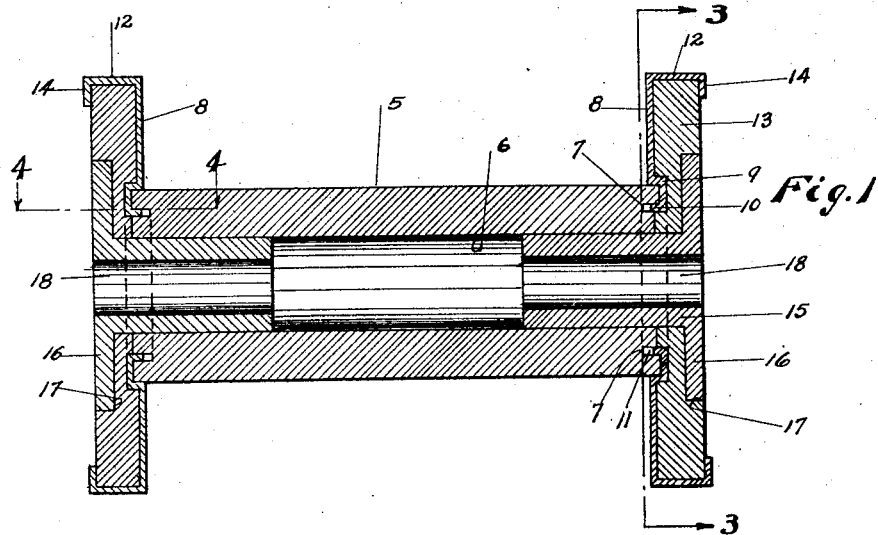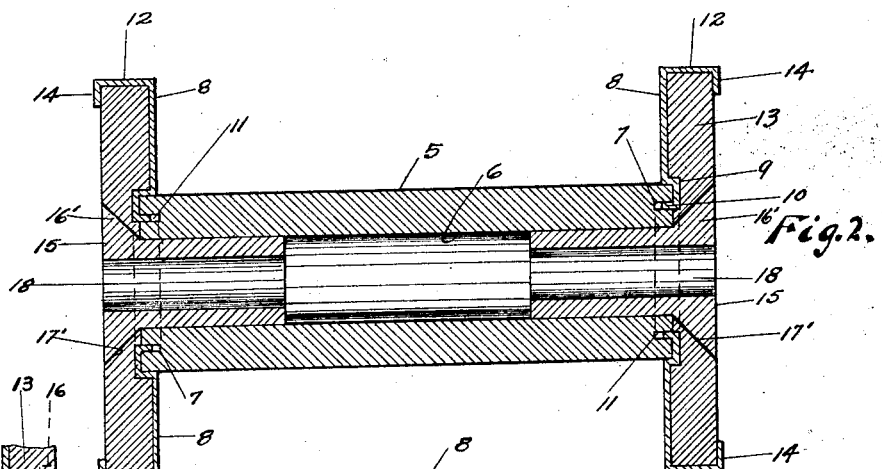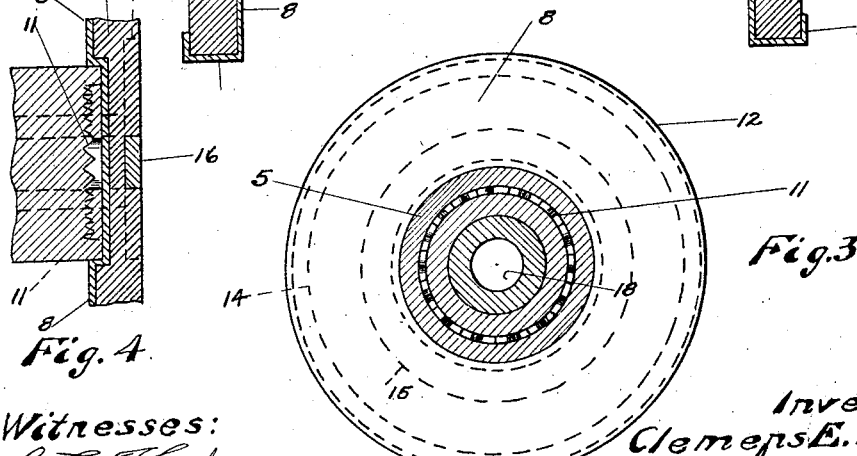

CLEMENS E. EHNBORN, OF CHICAGO, ILLINOIS.

SPOOL.

1,411,328. Specification of Letters Patent. Patented Apr. 4, 1922.

Application filed May 29, 1920. Serial No. 385,136.

*To all whom it may concern:*

Be it known that I, CLEMENS E. EHNBORN, a citizen of the United States, and a resident of the city of Chicago, county of Cook, and State of Illinois, have invented certain new and useful Improvements in Spools, of which the following is a specification.

My invention relates to new and useful improvements in spools, and has for its object the provision of an improved construction of this character providing a composite spool of simple construction, strong and durable in use and capable of economic manufacture.

Other objects will appear hereinafter.

The invention consists in the combinations and arrangements of parts hereinafter described and claimed.

The invention will be best understood by reference to the accompanying drawings forming a part of this specification, and in which, Fig. 1. is a longitudinal section of a spool embodying the invention, Fig. 2, a longitudinal section of a slightly modified form of construction, Fig. 3, a section taken on line 3—3 of Fig. 1, and Fig. 4, a section taken on line 4—4 of Fig. 1.

The form of construction illustrated in Figs. 1, 3 and 4 comprises a central hub 5 of wood or the like and having a central bore 6 as shown. The hub 5 is provided at each end with an annular recess or groove 7 surrounding the bore 6 and co-axial therewith. A metallic spool flange 8 is fitted over each end of the hub 5, said flange being provided with a central hub 9 fitting snugly over the corresponding end of hub 5 and with an inwardly turned annular flange 10 having teeth 11 at its edge, said flange 10 being driven or forced into the recess 6 to embed the teeth 11 in the body of the hub 5, and thus prevent turning of the flange on the hub. Each spool flange 8 is provided with a peripheral flange 12 inclosing a filler head or block 13 of wood or similar material, and held in place by an inwardly spun retaining flange 14 as shown. Each filler head 13 is provided with a central perforation or bore registering with the bore 6 in the hub 5, and a plug 15 is fitted into said bores as shown. Each of the plugs 15 is provided at its outer end with an annular flange or head 16 fitting snugly within a corresponding recess 17 in the filler head 13, said plug being glued in place after insertion, and serving to hold the corresponding spool flange in place. Each plug 15 is provided with a central perforation or bore 18 as indicated to provide the spool with the usual perforation or bore extending therethrough. By this arrangement, a composite spool which is strong and durable in use may be made very economical.

In the modified form of construction illustrated in Fig. 2, the plug 15 is provided with a conical securing head 16' fitted into a conical recess 17' provided in the filler head 13 for the purpose. Otherwise, the construction is identical with that already described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A spool comprising a hub of fibrous material having an annular recess in its end; and a flange on said spool having an annular flange to snugly fit said recess to prevent rotation of said flange on said hub, substantially as described.

2. A spool comprising a hub of fibrous material and having an annular recess in its end; and a metallic flange on said spool having an annular flange to snugly fit said recess to prevent rotation of said flange with respect to said hub, substantially as described.

3. A spool comprising a hub of fibrous material and having an annular recess in its end; a metallic flange on said spool having an annular flange to fit said recess; teeth on the edge of said annular flange engaging said hub to prevent rotation of said flange thereon, substantially as described.

4. A spool comprising a hub of fibrous material and having an annular recess in its end; a metallic flange threaded on said spool and having an annular flange to fit said recess; teeth on the edge of said annular flange engaging said hub to prevent rotation of said flange thereon; and a filler head of fibrous material in said metallic spool flange, substantially as described.

5. A spool comprising a hub of fibrous material having a central bore and an annular recess in its end surrounding said bore; a metallic flange having a hub fitting over the end of said spool hub and an inwardly turned annular flange fitting said recess, the edge of said annular flange being provided with teeth; a filler head of fibrous material secured to said metallic spool flange, said filler head being provided with a central perforation registering with the bore in said hub; and a centrally perforated plug of fibrous material passing through the central opening in said filler head and fitting within the bore in said hub, said plug being provided with a head at its outer end; and said filler head being recessed to receive said plug head, substantially as described.

In testimony whereof I have signed my name to this specification in the presence of two subscribing witnesses.

CLEMENS E. EHNBORN.

Witnesses:
 Joshua R. H. Potts,
 Rose K. Trib.